(12) United States Patent
Gavish et al.

(10) Patent No.: US 7,136,412 B1
(45) Date of Patent: Nov. 14, 2006

(54) ALWAYS-ON ACCESS SERVER POOL

(75) Inventors: Amnon Gavish, Bikaat-Beit-Hakerem (IL); Oren Somekh, Moshav Beit Shearim (IL); Abner Volterra, Misgav (IL)

(73) Assignee: Surf Communication Solutions Ltd., Yokneam (IL)

( * ) Notice: Subject to any disclaimer, the term of this patent is extended or adjusted under 35 U.S.C. 154(b) by 0 days.

(21) Appl. No.: 10/129,811

(22) PCT Filed: May 9, 2000

(86) PCT No.: PCT/IL00/00266

§ 371 (c)(1),
(2), (4) Date: May 9, 2002

(87) PCT Pub. No.: WO01/35625

PCT Pub. Date: May 17, 2001

(30) Foreign Application Priority Data

Nov. 11, 1999 (IL) .................................... 132888

(51) Int. Cl.
H04B 1/38 (2006.01)
(52) U.S. Cl. ..................................................... 375/222
(58) Field of Classification Search ................ 375/219, 375/222; 370/352–354, 392, 469
See application file for complete search history.

(56) References Cited

U.S. PATENT DOCUMENTS

| | | | |
|---|---|---|---|
| 4,965,641 A | 10/1990 | Blackwell et al. | |
| 4,974,256 A | 11/1990 | Cyr et al. | |
| 5,287,461 A | 2/1994 | Moore | |
| 5,446,730 A * | 8/1995 | Lee et al. | ................... 370/351 |
| 5,546,388 A | 8/1996 | Lin | |
| 5,590,345 A | 12/1996 | Barker et al. | |
| 5,598,536 A | 1/1997 | Slaughter et al. | |
| 5,649,108 A | 7/1997 | Spiegel et al. | |
| 5,701,482 A | 12/1997 | Harrison | |
| 5,721,830 A | 2/1998 | Yeh et al. | |
| 5,748,629 A | 5/1998 | Caldara et al. | |
| 5,790,534 A | 8/1998 | Kokko et al. | |
| 5,790,781 A | 8/1998 | Cox et al. | |
| 5,794,058 A | 8/1998 | Resnick | |
| 5,799,064 A | 8/1998 | Sridhar et al. | |
| 5,809,066 A | 9/1998 | Suomi et al. | |
| 5,852,655 A | 12/1998 | McHale et al. | |
| 5,892,818 A | 4/1999 | Lee | |

(Continued)

FOREIGN PATENT DOCUMENTS

EP 0 491 489 6/1992

(Continued)

OTHER PUBLICATIONS

Crovella, M. E. et al. for USENIX; Abstracts "Connection Scheduling in Web Servers;" last changed Sep. 23, 1999; 1 page retrieved from the internet on Jan. 30, 2002 <http://www.usenix.org./events/usits99/crovella.html>.

(Continued)

*Primary Examiner*—Don N. Vo
(74) *Attorney, Agent, or Firm*—Fenster & Company (57) ABSTRACT

A method of managing a DSL connection by a DSL server modem, including receiving signals from a DSL client modem at a first rate, determining, by the DSL server modem, a data content of the received signals, and initiating, by the DSL server modem, negotiation of a change in the rate of the DSL connection, responsive to the determination of the data content, so as to receive signals at a second rate different from the first rate.

19 Claims, 4 Drawing Sheets

U.S. PATENT DOCUMENTS

| | | | |
|---|---|---|---|
| 5,896,376 | A | 4/1999 | Alperovich |
| 5,896,386 | A | 4/1999 | Johnston |
| 5,905,725 | A | 5/1999 | Sindhu et al. |
| 5,909,384 | A | 6/1999 | Tal et al. |
| 5,920,599 | A | 7/1999 | Igarashi |
| 5,925,114 | A | 7/1999 | Hoang |
| 5,931,950 | A | 8/1999 | Hsu |
| 5,940,459 | A | 8/1999 | Hsu et al. |
| 5,960,035 | A | 9/1999 | Sridhar et al. |
| 5,982,750 | A | 11/1999 | Tabe et al. |
| 5,982,776 | A | 11/1999 | Manning et al. |
| 5,982,814 | A | 11/1999 | Yeh et al. |
| 5,995,540 | A | 11/1999 | Draganic |
| 5,999,809 | A | 12/1999 | Watanabe |
| 6,006,318 | A | 12/1999 | Hansen et al. |
| 6,088,732 | A | 7/2000 | Smith et al. |
| 6,112,243 | A | 8/2000 | Downs et al. |
| 6,148,006 | A | 11/2000 | Dyke et al. |
| 6,160,843 | A | 12/2000 | McHale et al. |
| 6,163,599 | A | 12/2000 | McHale |
| 6,307,836 | B1 * | 10/2001 | Jones et al. ............... 370/230 |
| 6,349,123 | B1 | 2/2002 | Kim |
| 6,385,203 | B1 | 5/2002 | McHale et al. |
| 6,457,037 | B1 | 9/2002 | Maytal |
| 6,516,350 | B1 | 2/2003 | Lumelsky et al. |
| 6,667,972 | B1 * | 12/2003 | Foltan et al. ............... 370/354 |
| 6,711,159 | B1 | 3/2004 | Grabelsky et al. |

FOREIGN PATENT DOCUMENTS

| | | |
|---|---|---|
| EP | 0 831 624 | 3/1998 |
| EP | 0 859 492 | 8/1998 |
| EP | 0 913 770 | 5/1999 |
| WO | WO 98/54868 | 12/1998 |
| WO | WO 99/06913 | 2/1999 |
| WO | WO 99/20033 | 4/1999 |
| WO | WO 99/39530 | 8/1999 |
| WO | WO 00/11843 | 3/2000 |

OTHER PUBLICATIONS

Gopalakrishnan,R. et al.; "Efficient User-Space Protocol Implementations with QoS Guarantees Using Real-Time Upcalls;" Aug. 4, 1998; pp. 374-388; IEEE/ACM Transactions on Networking; vol. 6; No. 4; XP000771968.

Held, G.; "The Complete Modem Reference;" John Wiley and Sons; pp. 260-262; XP002153737.

MacVittie,D. for Sun.com; "Best Practices How-Tos: Tuning your iPlanet[tm] Web Server;" Nov. 19, 2001; pp. 1-7; retrieved from the internet on Jan. 24, 2002 <http://dcb.sun.com/practices/howtos/tuning_iplanet.jsp>.

Newton's Telecom Dictionary, the Official Dictionary of Telecommunications& the Internet; 15th Updated, Expanded and Much Improved Edition; Feb. 1999; pp. 645, 660; "RAC- Remote Access Concentrator" and "Remote Access Server".

Zeus Technology Inc.; Zeus Load Balancer v1.4; Chapter 1—Sizing Guide; retrieved from the internet on Jan. 24, 2002 <http://support.zeus.com/doc/zlb/sizing_guide.pdf>.

"T.38"; ITU-T TelecommunicationStandardizationSector of ITU; Jun. 18, 1998; XP002163782.

Gieseler, S.; "Tunnelbau. Remote-Access-Serverals Basis für Virtual Private Networks;" Net—Zeitschrift Fuer Kommunikationsmanagement,Huthig Verlag; vol. 52; No. 8/9; 1998; pp. 38-40; XP000782761.

Eyuboglu,V. M. et al.; "Advanced Modulation for V.Fast;" May-Jun. 1993; pp. 243-256; Invited Paper; European Trans. on Telecommunicationsand Related Technologies; vol. 4; No. 3.

Forney,D. G. Jr. et al.; "The V.34 High-Speed Modem Standard;" Dec. 1996; pp. 28-33; IEEE Communications Magazine.

* cited by examiner

ALWAYS-ON ACCESS SERVER POOL

RELATED APPLICATIONS

This application is a U.S. national filing of PCT Application No. PCT/IL00/00266, filed May 9, 2000.

FIELD OF THE INVENTION

The present invention relates to communication systems and in particular to systems for handling remote access connections.

BACKGROUND OF THE INVENTION

Most homes in the developed part of the world are connected to a public telephone network through copper wires which lead from the homes to neighboring switching and access equipment, located in a telephone service central office or in a digital loop carrier (DLC) referred to hereinbelow as switching boxes. At the switching boxes, the signals passed on the copper wires are passed onto larger wires (referred to as trunks) which connect to a public telephone network. The usable bandwidth of the copper wires is relatively large (of the order of several MHz), however, regular telephone calls (POTS) utilize only a small portion of the bandwidth.

Standard Voice-band (V series) modems use the bandwidth conventionally used for telephone calls to exchange data packets with an Internet Service Provider (ISP). In most cases clients connect to the ISP immediately before they need to connect to the Internet and disconnect immediately thereafter, generally because the costs of telephone calls are a function of their duration. Establishing the modem connection requires between about 0.5–1 minutes during which the client cannot use the connection. Clients who pay for telephone calls according to their duration must pay also for the time in which the modem connection is being established.

Digital subscriber line (DSL) connections provide continuous communication with the ISP at a flat rate, such that there is no need to establish a connection each time access to the Internet is sought. In addition, DSL connections provide larger bandwidth connections as they utilize nearly the entire usable bandwidth of the copper wires. In forming a DSL connection, a pair of DSL modems are located on the opposite ends of the copper wires, in the user's home and in a digital subscriber line access multiplexer (DSLAM) in (or near) the central office or DLC. One or more links, usually separate from the telephone trunks, connect the DSLAM to a data network. In many cases the bandwidth of the link connecting the DSLAM to the data network is smaller than required to handle data from all the client modems connected to the DSLAM. The size of the link is chosen based on statistical measurements and the use of the link is distributed between the client DSL modems based on quality of service (QoS) and other criterions.

When there is interference on the copper wires, for example when the copper wires are used concurrently with the DSL connection for a telephone call, the data rate of the DSL connection is reduced to allow proper detection of the signals despite the interference. The DSL modems may adjust to the lower transmission rate using a procedure referred to as fast retraining or retrain, for example, as described in the G.992.1 and G.992.2 ITU recommendations.

The number of DSL modems positioned in a DSLAM is limited by various physical constrains, such as the space required for the DSL modems, their power consumption, and their heat dissipation capabilities (referred to as maximum heat density).

One method used to reduce the maximum heat density is using single-chip modem pools which serve a plurality of client DSL modems in parallel. These DSL modem pools have sufficient processing power to serve the connections to all the client modems they serve at the maximal usable bandwidth of the twin pair copper wires. One such modem pool is the TNETD4000C ADSL central office chip-set of Texas Instruments, Inc.

SUMMARY OF THE INVENTION

An aspect of some embodiments of the present invention relates to a DSL modem pool which communicates with a plurality of client DSL modems at dynamically adjusted data rates. The maximal processing power of the DSL modem pool is smaller than required to communicate with all the client DSL modems at the maximal data rates allowed by the usable bandwidth of the links connecting to the client DSL modems. In some embodiments, the maximal processing power of the DSL modem pool is smaller than required to communicate with all the client DSL modems at maximal data-rates promised to these client modems. The number of client DSL modems connected to the modem pool is selected according to statistical measurements, such that the actual service required from the modem pool will (statistically) almost never exceed the capabilities of the modem pool. The modem pool may be implemented by a single processor or by a plurality of processors coordinated by one or more load balancers.

In some embodiments of the invention, the processing power of the DSL modem pool is sufficient to handle an accumulated data rate substantially equal to the data rate supported by the link leading from the DSL modem pool to an ISP.

In an embodiment of the invention, the number of client DSL modems (subscribers) connected to the DSL modem pool is determined based on quality of service (QoS) criterions, which reflect the service level agreements (SLA) made with the subscribers. For example, a DSL modem pool may connect to a given number of high QoS client modems or to twice the given number of low QoS client modems. In an embodiment of the invention, when a larger number of client modems than can be handled by the modem pool concurrently require service, the service is provided to the higher QoS client modems or is distributed among the client modems according to QoS and other criteria.

An aspect of some embodiments of the present invention relates to a DSL modem pool which has a sleep state in which the modem requires lower processing power than required to handle full-scale communication with a client modem. In some embodiments of the invention, the DSL modem pool moves connections to the sleep state at its initiative. For example, whenever the modem pool detects that no data is being passed to/from the client modem, the modem pool may move the connection into the sleep state. In an embodiment of the present invention, the sleep state requires less than 50%, 20% or even 10% of the processing power required for full scale communication with the client modem.

There is therefore provided in accordance with an embodiment of the invention, a method of managing a DSL connection by a DSL server modem, including receiving signals from a DSL client modem at a first rate, determining, by the DSL server modem, a data content of the received signals, and initiating, by the DSL server modem, negotiation of a change in the rate of the DSL connection, responsive to the determination of the data content, so as to receive signals at a second rate different from the first rate.

In an embodiment of the invention, receiving signals from the client modem at the first rate includes receiving at a rate close to or equal to the maximal rate of the DSL connection.

Alternatively or additionally, receiving signals from the client modem at the first rate includes receiving at a rate equal to the maximal rate allotted to the DSL client modem. In an embodiment of the invention, determining the data content of the received signals includes determining whether the signals include information. In an embodiment of the invention, initiating a change in the rate of the connection responsive to the determination includes initiating the change if the received signals do not carry information for longer than a predetermined idle period. Alternatively or additionally, initiating a change in the rate of the connection responsive to the determination includes initiating the change if the received signals carry information. In an embodiment of the invention, the first rate is at least ten times slower than the second rate. Alternatively, the first rate is at least ten times faster than the second rate. In an embodiment of the invention, the second rate is close to or equal the lowest rate sustained by the DSL connection. In an embodiment of the invention, the method includes transmitting signals to the client modem and initiating negotiation of a change in the rate of the DSL connection is performed responsive to a determination of the data content of the transmitted signals. In an embodiment of the invention, the server modem includes a plurality of processors and including transferring the connection from being handled by a first processor to a second processor concurrently with the negotiation of the change of rate. In an embodiment of the invention, determining the data content of the received signals includes examining the received signals.

There is further provided in accordance with an embodiment of the invention, a method of servicing DSL client modems, including connecting a plurality of DSL client modems with respective maximal transmission data rates to a DSL server modem pool, and transmitting signals to most of the DSL client modems at data rates substantially lower than their respective maximal data rates, substantially throughout the operation of the connections. In some embodiments, transmitting signals to most of the DSL client modems at data rates substantially lower than their respective maximal data rates includes transmitting to the most of the DSL client modems signals at rates lower than 20% of the respective maximal data rates. In an embodiment, the server modem pool has a processing power substantially lower than required to handle the plurality of DSL connections at their maximal data rates.

There is further provided in accordance with an embodiment of the invention, a DSL modem pool, including an array of one or more processors which have a total processing power sufficient to handle connections with a predetermined number of client DSL modems at maximal data rates promised to the client modems, and an analog front end which connects the array of processors to a number of client DSL modems larger than the predetermined number of client DSL modems. In an embodiment of the invention, the analog front end connects to at least twice the predetermined number of client DSL modems. In an embodiment of the invention, the array of one or more processors handles at least one of the client modems at a rate substantially lower than the respective maximal data rate promised to the at least one client modem. In some embodiments, the modem pool includes a scheduler which dynamically determines which at least one of the client modems are handled at a rate substantially lower than the respective maximal data rate promised to the at least one client modem.

There is further provided in accordance with an embodiment of the invention, a DSL modem pool, including a first group of one or more processors which each handles one or more DSL connections at a common first data rate, and a second group of one or more processors which each handle one or more DSL connections at a common second data rate different from the first data rate. In some embodiments, the first and second groups handle DSL connections to client modems having different quality of service (QoS). In an embodiment of the invention, the first rate is at least ten times faster than the second rate. In some embodiments, the DSL modem includes a common memory which includes a record for each of the client modems connected to the modem pool and which is accessible by all the processors in the first and second groups.

There is further provided in accordance with an embodiment of the invention, a DSL modem pool for servicing a plurality of DSL client modems, including a plurality of processors each of which handles one or more of the DSL client modems; and a scheduler which dynamically schedules the DSL client modems handled by each of the processors.

In an embodiment of the invention, the scheduler transfers the handling of a client modem from a first processor to the second processor if the client modem requires an increase in the processing power, which increase is above the available processing power of the first processor. In an embodiment of the invention, the modem pool includes a common memory which includes a record for each of the DSL client modems serviced by the modem pool and which is accessible by all the processors of the modem pool. In an embodiment of the invention, each of the DSL client modems handled by the modem pool has a maximal data rate at which it may operate and the combined processing power of all the processors of the modem pool is substantially less than the processing power required to handle all the DSL client modems handled by the modem pool at their respective maximal data rates. In an embodiment of the invention, the combined processing power of all the processors of the modem pool is less than a fifth of the processing power required to handle all the DSL client modems handled by the modem pool at their respective maximal data rates. In an embodiment of the invention, the modem pool includes a front end which has a separate interface for each of the client modems and at least one switch which dynamically connects each of the interfaces of the front end to one or more of the plurality of processors, under instructions of the scheduler. In an embodiment of the invention, the modem pool includes at least one multiplexer which connects the interfaces of the front end to the at least one switch.

There is further provided in accordance with an embodiment of the invention, a DSL modem pool, including a DSL front end which connects to a plurality of DSL client modems; and at least one processor which handles the transmission of signals to the client modems, through the front end, at variable data rates and which initiates changing the data rates at which the signals are transmitted responsive to the information content of the transmitted signals. In an embodiment of the invention, the at least one processor handles the transmission such that substantially always the signals transmitted to at least one dynamically chosen client modem are at a rate substantially lower than a maximal allowed rate.

There is further provided in accordance with an embodiment of the invention, a method of servicing a client modem by a modem pool including a plurality of processors, including establishing a connection between a first processor and the client modem, handling the client modem by the first processor, and transferring the handling of the client modem to a second processor while the connection with the client modem is in force. In an embodiment of the invention, transferring the handling of the client modem is performed responsive to an increase in the processing power required for handling the client modem. Alternatively or additionally, transferring the handling of the client modem is performed responsive to an increase in the processing power required by a different client modem handled by the first processor.

BRIEF DESCRIPTION OF FIGURES

The invention will be more clearly understood by reference to the following description of embodiments thereof in conjunction with the figures, in which.

DETAILED DESCRIPTION OF EMBODIMENTS

Figure 1:
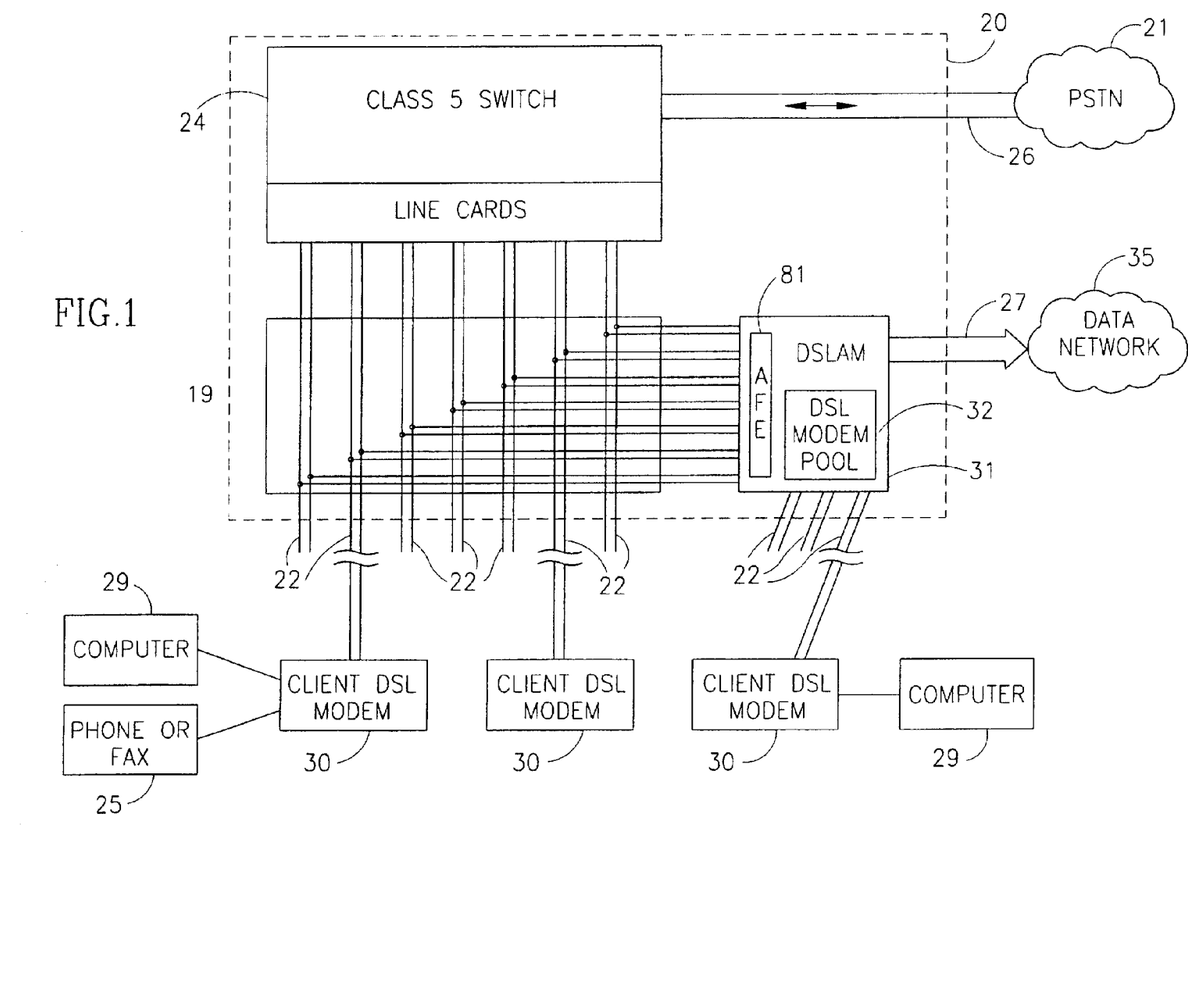
FIG. 1 is a schematic illustration of a DSL supporting switching box and some relevant connections thereto, in accordance with an embodiment of the present invention.

FIG. 1 is a schematic illustration of a DSL supporting switching box 20 and connections thereto, in accordance with an embodiment of the present invention. Switching box 20 connects a plurality of copper lines, e.g., twisted pairs (TP) 22, through a line card and switch pool 24, to a trunk 26 which leads to further parts of a public switching telephone network (PSTN) 21. Trunk 26 provides service to phones or faxes 25 at the client ends of TPs 22. A plurality of TPs 22, are connected to user sites which have client DSL modems 30, in addition to, or instead of, their connections to phones or faxes 25. Generally, client DSL modems 30 are connected to computers 29. The TPs 22 which connect to client modems 30, are connected within switching box 20, either directly or through a splitter 19, to a digital subscriber line access multiplexer (DSLAM) 31. DSLAM 31 connects client modems 30 to a data network 35, such as the Internet, through a link 27. DSLAM 31 includes an analog front end (AFE) 81 which performs A/D and D/A conversions of the signals passed on TPs 22 and a DSL modem pool 32 which services the client DSL modems 30. In some embodiments, client DSL modems 30 are standard modems known in the art, and no changes are required in client DSL modems 30 in order to practice the present invention.

Figure 2:
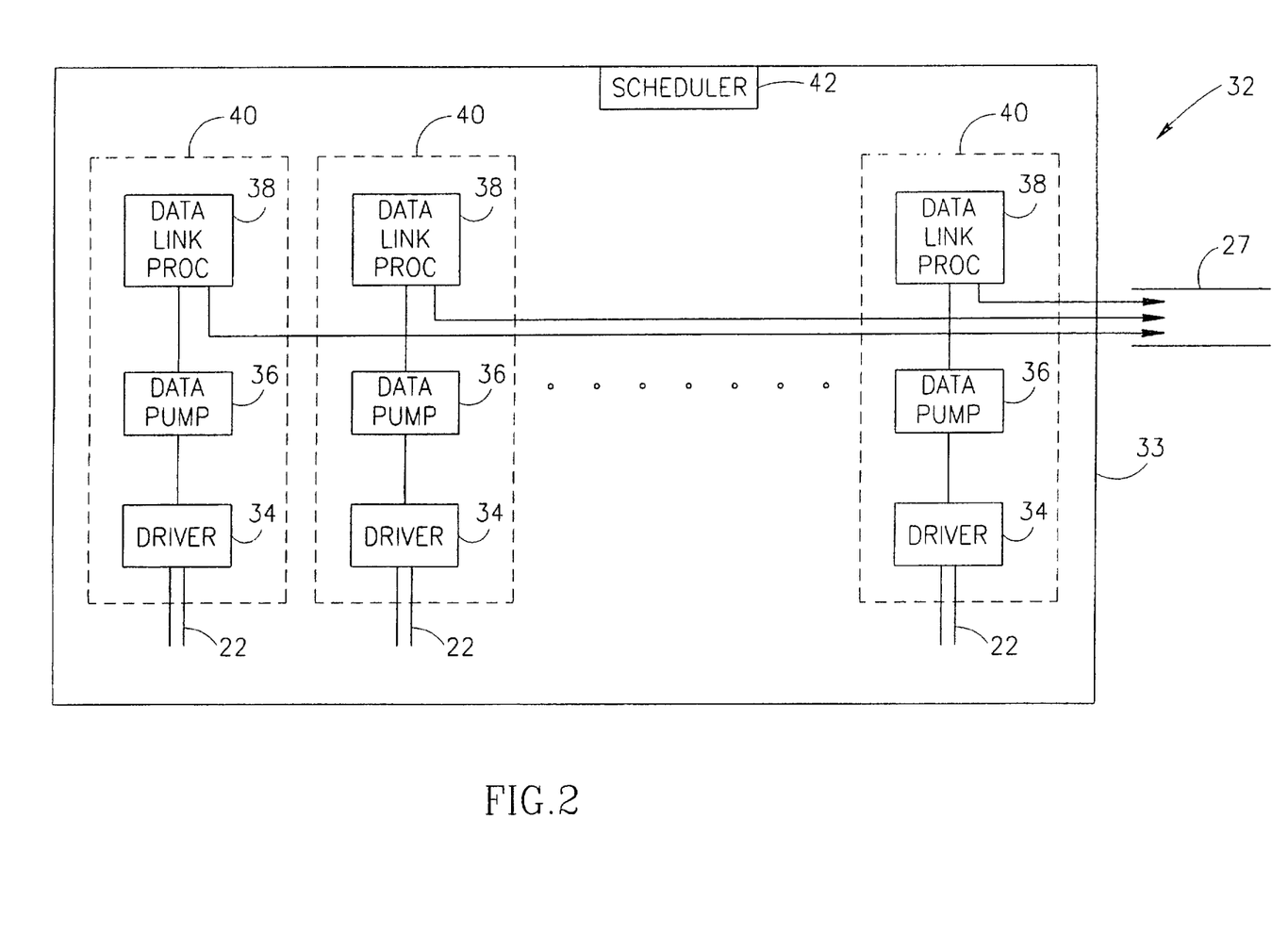
FIG. 2 is a schematic illustration of the software of a DSL modem pool, in accordance with an embodiment of the present invention.

FIG. 2 is a schematic illustration of the software running on modem pool 32, in accordance with an embodiment of the present invention. For each of TPs 22 that is connected to modem pool 32, the modem pool runs a software package 40 which handles the DSL signals passed on the respective TPs 22. Software package 40 includes, in some embodiments, a driver 34, a physical layer data pump 36 which modulates and demodulates signals transmitted and received over lines 22 and a data link procedure 38 which controls the flow of data over lines 22. Data link procedure 38 performs bit manipulation of the transmitted and received signals, including, for example, flow control and optionally error correction and/or detection. It is noted that in some embodiments, rather than having different software packages 40 for each client modem 30, modem pool 32 runs a single software package 40 which operates on different data from the different client modems.

In an embodiment of the present invention, modem pool 32 comprises a single processor 33 which runs all the drivers 34, data pumps 36 and data-link procedures 38. Alternatively, modem pool 32 comprises a plurality of processors, which run different software procedures. In an embodiment of the invention, a first processor, for example a DSP processor, runs drivers 34 and data pumps 36 and a second processor (referred to also as a controller), for example a RISC processor, runs data link procedures 38. Further alternatively, modem pool 32 comprises a plurality of processors which run different groups of software packages 40. This alternative is described in detail further hereinbelow, with relation to FIG. 4.

Processor 33 has a predetermined processing power which is divided between software packages 40, for example by a scheduler 42. Each software package 40 utilizes an amount of processing power which is measured, for example, as a percentage of the processing time of processor 33 or in millions of instructions per second (MIPS). The processing power of a software package 40 is a function of the rate at which the software package transmits and receives data. Therefore, the processing power required by each software package 40 changes with the data rate of the data handled by the software package.

In some embodiments of the invention, the processing power of modem pool 32 (i.e., processor 33 when modem pool 32 has only a single processor) is smaller than the processing power required to handle the client modems 30 serviced by the modem pool at the maximal data rates which can be passed on TPs 22. In some of these embodiments, the processing power of modem pool 32 is smaller than the processing power required to handle the client modems 30 serviced by the modem pool at the maximal data rates promised to the client modems 30. In an embodiment of the invention, the processing power required to handle client modems 30 at the promised maximal data rates is four times, eight times or even ten times the processing power of modem pool 32, depending on the number of client modems 30, the quality of service (QoS) promised to the users of the client modems and/or the use profiles of the client modems.

In some embodiments of the invention, the processing power of modem pool 32 is related to the size of link 27, such that the limitations on the total data rates of client modems 30, imposed by modem pool 32 and link 27 are substantially the same. In an embodiment of the invention, the processing power of modem pool 32 is substantially that required to handle the maximal data rate allowed by link 27.

Figure 3:
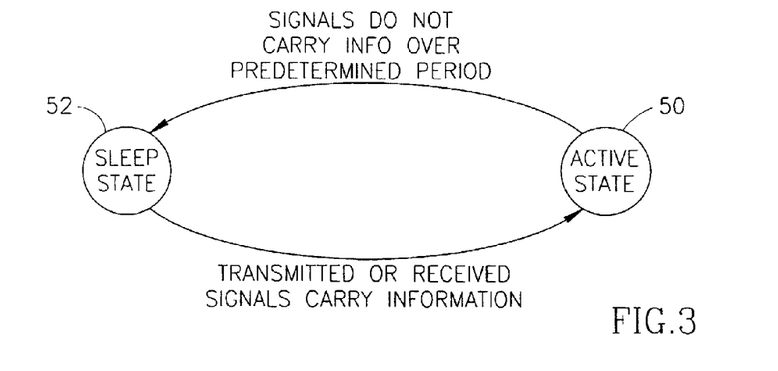
FIG. 3 is a state diagram of a software package run on a modem pool, in accordance with an embodiment of the present invention.

FIG. 3 is a state diagram of software package 40, in accordance with an embodiment of the invention. In the embodiment shown in FIG. 3, software package 40 may operate in one of two states: an active state 50 and a sleep state 52. Software packages 40 which are servicing client modems 30 currently in use are operated in active state 50 while other software packages 40 are kept in sleep state 52. Modem pool 32 moves software packages 40 between active state 50 and sleep state 52 dynamically based on the usage of client modems 30.

In active state 50, software package 40 operates at a maximal data rate to which the user of the respective client DSL modem 30 is entitled. In an embodiment of the invention, the data rate during active state 50 is the maximal data rate which can be passed on copper wires 22 using DSL modems 30 and 32, e.g., about 8 Megabits per second (Mbps). Alternatively, the maximal data rate is a function of quality of service (QoS), as defined for example by service level agreements (SLA). For example, users may pay a plurality of different sums for the DSL service, and the data rate during active state 50 is a function of the sum paid by the user. In an embodiment of the invention, processor 33 handles concurrently a plurality of client modems 30 with different data rates in active state 50.

In an embodiment of the present invention, software package 40 operates in sleep state 52 at a minimal data rate of DSL connections which guarantees that the connection remains active. In an exemplary embodiment of the invention, the data rate in sleep state 52 is the lowest rate supported by a communication standard to which client modem 30 adheres, e.g., about 64 Kbps, so that client modem 30 does not disconnect the connection due to lack of signals. In some embodiments of the invention, the minimal data rate may be affected by higher layer standards, such as ATM, in addition to or instead of physical and data link layer standards. Alternatively, in embodiments in which data is transmitted (for short periods) also in sleep state 52, the data rate during sleep state 52 is chosen according to QoS factors and/or as a rate sufficient to provide sufficient service for most interactive data transfers. In an embodiment of the invention, during sleep state 52, software package 40 operates at a data rate lower than 0.5 Mbps, optionally less than 0.1 Mbps.

In an embodiment of the invention, during sleep state 52 software package 40 skips some of the routines it normally performs. For example, during sleep state 52 software package 40 may skip error correction/detection procedures and/or modulation/demodulation of signals which are known not to carry information. Thus, the processing power required by software package 40 during sleep state 52 is further reduced. In an embodiment of the invention, the processes are skipped only for signals transmitted from client modem 30 to modem pool 32 as these signals necessarily do not carry information. It is noted that during sleep state 52 meaningful data may still be transmitted, although at a relatively low rate.

In an exemplary embodiment of the invention, processor 33 has a total power of 3000 MIPS. Software packages 40 in active state 50 consume 500 MIPS while in sleep state 52 software packages 40 consume 50 MIPS. Assuming that usually less than 10 percent of client modems 30 serviced by modem pool 32 are in active state 50, processor 33 can handle thirty three client modems 30. Three of the client modems 30 are allowed to be active, consuming 3×500=1500 MIPS, and thirty of the client modems 30 are in sleep state 52, consuming 30×50=1500 MIPS.

In an embodiment of the present invention, data link procedure 38 keeps track of whether the signals it transmits to, and receives from, client DSL modem 30 carry information. In some embodiments of the invention, when in active state 50 the transmitted and received signals do not carry information for at least a predetermined idle period, software package 40 moves to sleep state 52. When during sleep state 52 the transmitted or received signals carry information, software package 40 is moved to active state 50.

In an embodiment of the invention, data link procedure 38 identifies that the signals it transmits and/or receives are not carrying information, by identifying long sequences which are standardly used as fillers by client DSL modems 30 when they have no information to transmit. Such sequences include for example long sequences of '1' bits or long sequences of alternating '1' and '0' bits. Alternatively or additionally, data link procedure 38 consults control signals accompanying the data signals, which identify the transmitted data.

Alternatively to keeping track of both the signals transmitted to and the signals received from client DSL modem 30, data link procedure 38 keeps track only of the signals received from client modem 30 or of the signals transmitted to client modem 30. Since substantially all transmissions in one direction are accompanied by acknowledgments in the other direction it is considered sufficient to keep track of only one direction.

Alternatively to moving to active state 50 if either the signals received from client modem 30 or transmitted to client modem 30 carry information, software package 40 remains in sleep state 52 even if information carrying signals are transmitted to client modem 30, as long as information carrying signals are not received from the client modem. In some embodiments of this alternative, software package 40 examines the contents of the signals received from client modem 30 to determine whether the signals include user initiated data or computer generated data, such as acknowledgments generated responsive to data transmitted to the client modem. Only if the signals from client modem 30 are user generated signals, software package 40 moves back to active state 50. Thus, if a flux of information is pushed to a computer 29 connected through client modem 30 when the respective software package 40 is in sleep state 52, the information is sent slowly, at the rate of sleep state 52, to the client modem, as it is assumed that a user is not sitting next to the computer. In an embodiment of the invention, computer 29 displays a control which when actuated sends a dummy message which signals to modem pool 32 that the user is sitting next to the computer and therefore, software package 40 should move from sleep state 52 to active state 50.

In some embodiments of the invention, when during sleep state 52 data is transmitted to client modem 30 but not from the client modem, software package 40 determines the rate at which data is being provided to modem pool 32 for transmission to client modem 30. If the determined rate is much larger than provided by sleep state 52, software package 40 moves to active state 50. Alternatively or additionally, if in sleep state 52 the data transmission to client modem 30 continues for over a predetermined transmission period, software package 40 moves to active state 50.

In some embodiments of the invention, software package 40 moves from active state 50 to sleep state 52 even if signals are transmitted to client modem 30, as long as information carrying signals (or user actuated signals) are not received from the client modem for over the predetermined idle period.

In an embodiment of the invention, the predetermined idle period after which software package 40 moves to sleep state 52 is selected so as to minimize the number of times in which software package 40 moves to sleep state 52 for a relatively short period. In one embodiment of the invention, the predetermined idle period is long enough such that software package 40 will generally not move to sleep state 52 while a user of computer 29 is in the middle of a session which uses client DSL modem 30. In an embodiment of the present invention, the predetermined idle period is longer than the average time in which people view information received over the Internet without requesting more information. Alternatively or additionally, the predetermined idle period is determined as a QoS factor, e.g., the length of the predetermined idle period is a function of the sum paid by the user for the DSL service. In an embodiment of the invention, the predetermined idle period is between about 2–30 minutes, for example about 5 or 20 minutes.

In an embodiment of the present invention, software package 40 moves from sleep state 52 to active state 50 immediately when meaningful information is detected. Alternatively, software package 40 waits a predetermined short period of time before moving to active state 50, allowing the user to receive at least a short response to the user generated signal which caused the movement between states, before software package 40 stops responding due to the movement between states. In an exemplary embodiment of the invention, software package 40 sends computer 29 a warning indication on the forthcoming lack of service due to the movement between states.

Further alternatively, the movement to active state 50 is performed when the amount of data transmitted or received by software package 40 reaches the bandwidth capacity during sleep state 52. Thus, the change in the data rate is performed only when the high bandwidth rates of active state 50 are needed in which case the user can endure a short delay due to data rate negotiation, as the amount of transmitted data is large and involves a long delay anyhow. Further alternatively or additionally, the movement between states is performed when the amounts of transmitted or received data reach the bandwidth capacity during sleep state 52 or when no data is transmitted, whichever happens first. Thus, in many cases the movement between states will be performed during a time in which no data is being transmitted, and there will be substantially no interference to the user operation. Optionally, the user may choose in the service level agreement (SLA) which of the above options is used.

In some embodiments of the present invention, software package 40 may operate in more than two states, i.e., with more than two data rates. In an embodiment of the invention, one or more software packages 40 have three or more states: a sleep state, an active state and one or more intermediate rate states. The intermediate rate states operate at intermediate data rates between the data rate of sleep state 52 and active state 50, e.g., between half to a tenth of the data rate of the active state.

In some embodiments of the invention, the intermediate rate states are used only when processor 33 does not have sufficient processing power to allow all the software packages 40 which should be in the active state, to be in the active state. Thus, a client may purchase, for a cheap price, a DSL package which provides full bandwidth at most hours and reduced bandwidth at rush hours. Alternatively or additionally, the intermediate rate states are used as intermediate states between the sleep state and the active state. That is, software package 40 always moves from the sleep state to an intermediate rate state and only if necessary, does the software package 40 move to the active state. In some embodiments of the invention, if a client uses only small amounts of bandwidth in the active state for at least a predetermined period (e.g., as period equal to the idle period) the respective software package 40 is moved to an intermediate rate state. The movement to the intermediate state may be performed, for example, at the first chance in which no signals are transmitted from client modem 30 after it is decided to perform the state transition. Alternatively, a software package 40 is moved from the active state to the sleep state if it does not transmit information for the predetermined idle period or to an intermediate state if the processing power of processor 33 is exhausted.

In an embodiment of the present invention, the state at which software package 40 operates when it is not in sleep state 52, depends on one or more external parameters, such as the time and/or date. For example, a user may purchase a reduced-price DSL service package which provides service at the full data rate of active state 50 during the night and at an intermediate rate during the day, or vice versa.

In some embodiments of the present invention, before moving from sleep state 52 to active state 50, software package 40 checks with scheduler 42 whether processor 33 has sufficient processing power to handle the software package in active state 50. In an embodiment of the invention, scheduler 42 keeps track of the state of each of software packages 40 and compares the number of software packages 40 in active state 50 to a maximal allowed number of software packages 40 in active state 50. Alternatively, scheduler 42 keeps track of the actual amount of processing power utilized by each software package 40 and accordingly determines whether another software package 40 can be in active state 50.

In some embodiments of the invention, when a first software package 40 should move to active state 50 but processor 33 does not have sufficient processing power to allow the move, processor 33 waits until a different software package 40 moves from active state 50 to sleep state 52 before it moves the first software package to active state 50. Meanwhile, the client modem 30 serviced by the first software package 40 receives service at the low rate of sleep state 52. Alternatively or additionally, processor 33 selects a software package 40 in active state 50 and moves the selected software package to sleep state 52 to allow movement of the first software package 40 to active state 50. In some embodiments, the software package 40 moved to sleep state 52 is selected as the software package 40 for which information was not transmitted for the longest period. Alternatively or additionally, the selected software package is the software package 40 for which user generated signals were not generated for the longest period. In one embodiment, the selected software package 40 is moved to sleep state 52 only if it did not transmit information for at least a predetermined time.

Further alternatively or additionally, each software package 40 is associated with a priority or QoS indication, and the software package 40 in active state 50 with the lowest priority is moved to sleep state 52 if its priority is lower than the priority of the first software package 40. In some embodiments, the decision on which software package 40 is moved to sleep state 52 is performed based on a weighted function of the above described factors.

In some embodiments of the invention, when a software package 40 needs to move out of sleep state 52 while processor 33 does not have sufficient available processing power, one or more software packages 40 are moved to intermediate states so as to allow the software package 40 in sleep state 52 to move to active state 50 or to one of the intermediate states. The software packages moved to the intermediate states may be chosen using any of the above described methods of choosing the software package 40 to be moved to sleep state 52.

In an embodiment of the present invention, the number of client modems 30 serviced by modem pool 32 is chosen according to statistical information on the habits of the users of computers 29 such that the chances of a software package 40 requesting to move from sleep state 52 to active state 50 being refused are below a predetermined low probability.

In an embodiment of the present invention, the movements between sleep state 52 and active state 50 are performed using a method of negotiating a new data transfer rate between client modem 30 and modem pool 32. In some embodiments of the invention, the negotiation method only minimally interferes with the normal transmission of data between client modem 30 and modem pool 32, so as not to annoy a user who is waiting for data. In an embodiment of the invention, different methods of data rate negotiation are used for different state transitions. For example, when it is probable that the negotiation will annoy a user of computer 29, a fast negotiation method is used, while when it is assumed that a user is not presently using computer 29, a complete, relatively slow, negotiation method is used.

In an embodiment of the invention, in moving to sleep state 52 a complete negotiation method is used while in moving to active state 50 or to intermediate states a fast negotiation method is used.

In an exemplary embodiment of the invention, the movements between sleep state 52 and active state 50 are performed using the fast retraining method described in the above mentioned G.992.2 (G.Lite) ITU recommendation (which requires about 3 seconds) or the retraining method described in the G.SHDSL suggested ITU recommendation. Alternatively or additionally, the movements between sleep state 52 and active state 50 are performed using a variation of any initial training method, such as the method described in the G.992.1 (G.DMT) ITU recommendation. Further alternatively or additionally, any other method of changing the transmission rate on TPs 22 is used. For example, a quick method which does not include line testing may be used, especially for reducing the transmission rate, as a line which is suitable for a high data rate should surely be suitable for a lower data rate. When, for example, it is required to reduce the data rates of one or more active software packages 40 in order to allow a sleeping software package to move to an active or intermediate state, such a quick method is optionally used.

In one embodiment of the invention, during the initial training of the connection, parameters are determined for both active state 50 and sleep state 52 (and/or the intermediate states). When a transition between states is performed, the parameters determined during the initial training are used, in order to save time. In an exemplary embodiment of the present invention, during sleep state 52 client modem 30 and modem pool 32 periodically exchange test signals such that immediately when it is desired to move to active state 50 data rate negotiation is performed without performing the line tests.

The data rates in the upstream (from client 30) and downstream (to client 30) in any of the transmission states (i.e., active state 50, sleep state 52, and any intermediate states) may be the same or different according to the specific service level agreement of the user. It is noted that the division of the total bandwidth between the upstream and downstream may have different proportions in different states. In an exemplary embodiment of the invention, in sleep state 52 the bandwidth is divided equally between the upstream and the downstream, while in active state 50 most of the bandwidth is allocated to the downstream. In another exemplary embodiment of the present invention, during sleep state 52 most of the bandwidth is allocated to the downstream which in some cases, as described above, may continue to pass information during the sleep state without causing software package 40 to move to the active state.

In some embodiments of the invention, computer 29 may initiate movement to sleep state 52 in order to reduce the energy consumption of client modem 30. In an embodiment of the invention, when software package 40 is moved to sleep state 52 at the initiative of client modem 30, it only leaves the sleep state at the initiative of the client modem. Alternatively, software package 40 moves out of sleep state 52 according to any of the procedures described above, regardless of the reason it moved into the sleep state.

Figure 4:
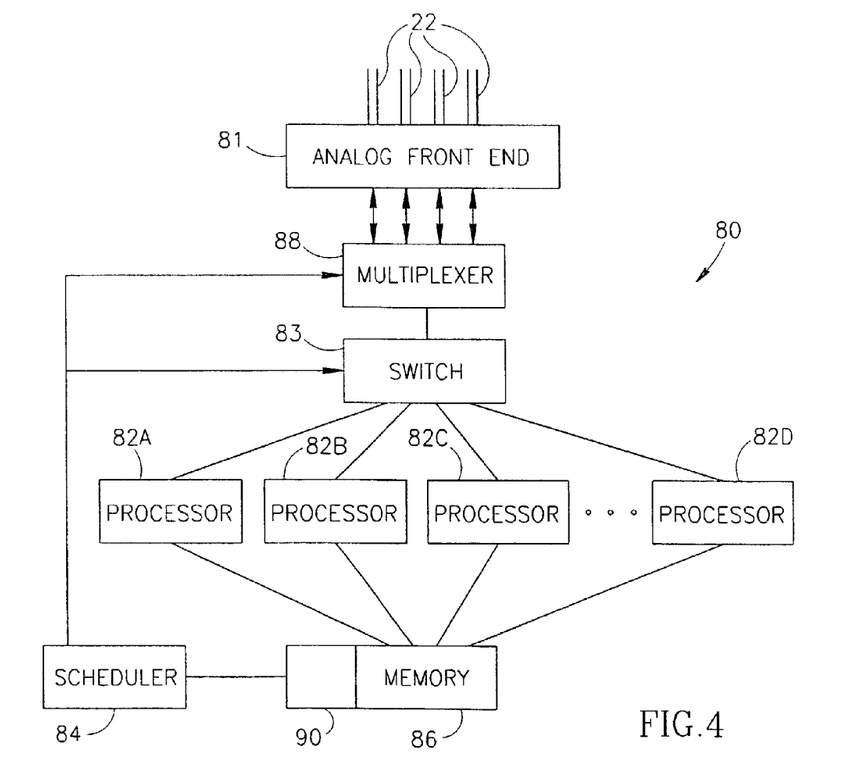
FIG. 4 is a schematic block diagram of a DSL modem pool, in accordance with an embodiment of the present invention.

FIG. 4 is a schematic block diagram of a DSL modem pool 80, in accordance with an embodiment of the present invention. Modem pool 80 comprises a plurality of processors 82 (marked 82A, 82B, etc.), which handle the signals received from and/or transmitted to the client DSL modems 30 connected to modem pool 80. Each processor 82 handles one or more client modems 30. Modem pool 80 is connected to a plurality of DSL client modems 30 in a manner similar to modem pool 32 shown in FIG. 1. In an embodiment of the invention, an analog front end (AFE) 81 provides signals from each of twisted pairs 22 to a multiplexer 88. A switch 83 dynamically connects the output of multiplexer 88 to one of processors 82. Alternatively, any other switching device is used to dynamically connect the outputs of AFE 81 to processors 82. For example, in one embodiment, each processor 82 has a respective multiplexer and switch which provide signals from one of TPs 22 to the processor. Alternatively, a complex switch with a connection for each output of AFE 81 is used without a multiplexor. Further alternatively or additionally, a parallel bus is used. In an embodiment of the invention, each output of AFE 81 writes on a sub-bus of the parallel bus and each processor listens to a group of one or more of the sub-buses. The sub-buses to which each AFE output writes and to which each processor listens are set dynamically. Alternatively, the sub-bus to which each AFE output writes is predetermined and only the identity of the sub-buses to which each processor listens changes dynamically. Further alternatively or additionally, a serial bus is used, optionally with a time division method.

In some embodiments of the invention, modem pool 80 also includes a common memory 86 which may be accessed by substantially all of processors 82. For each client modem 30 serviced by modem pool 80, common memory 86 comprises a record which stores information related to the client modem 30. In an embodiment of the invention, each record stores substantially all the information required by a processor 82 to handle the respective client modem 30, such that a processor 82 assigned to handle a client modem 30 does not need any information other than that found in the respective record in common memory 86.

In some embodiments of the invention, a scheduler 84 dynamically assigns to each of processors 82 a number of client modems 30 for handling. Accordingly, scheduler 84 controls multiplexer 88 and switch 83 to timely provide the signals from TPs 22 to the respective processors 82. In an embodiment of the invention, each processor 82 runs one or more drivers which accumulate the signals transmitted to modem pool 80 from the client modems 30 assigned to the processor. The accumulated signals are stored in the respective record within common memory 86 of the client modem 30 transmitting the signals.

In an embodiment of the invention, each processor 82 runs a data pump 36 which handles during a predetermined time cycle the data of all the client modems 30 assigned to the processor. In an embodiment of the invention, each processor 82 runs a scheduler (similar to scheduler 42 of FIG. 2) which determines the order in which client modems 30 assigned to the processor are to be handled. In an embodiment of the invention, each processor 82 handles each of the client modems 30 it is assigned consecutively according to a scheduled order, during the predetermined cycle. Alternatively, any other scheduling methods, such as the methods described in U.S. patent application Ser. No. 09/501,078, "Scheduling in a Remote-Access Server", filed on Feb. 9, 2000, the disclosure of which is incorporated herein by reference, are used by processors 82 in determining the order of handling the data of the different client modems 30 it is assigned.

In an embodiment of the invention, each processor 82 runs a data link procedure 38 (FIG. 2). In an embodiment of the invention, when data pump 36 completes handling the data of a client modem 30 it calls the data link procedure 38 to handle the data processed by the data pump 36. Alternatively or additionally, scheduler 42 schedules the operation of data pump 36 and data link procedure 38 independently.

When a processor 82 is scheduled to handle a specific client modem 30, the processor retrieves the respective record of the client modem from common memory 86 and processes the data of the client modem 30. When the processing is completed, all the information is stored again in common memory 86 for the next time the specific client modem 30 is processed.

In an embodiment of the invention, the internal scheduler of each processor 82 keeps track of the available processing power of the processor. When a client modem 30 handled by a processor 82 (for example 82A) needs to move to active state 50, processor 82A checks whether its available processing power is sufficient to allow the movement. If processor 82A does not have sufficient processing power to allow the movement, processor 82A notifies scheduler 84 which passes one or more of the client modems 30 handled by processor 82A to a different processor 82 which has a sufficient amount of available processing power. In an embodiment of the invention, the client modem 30 which needs to move to active state 50 is transferred to a different processor which has sufficient available processing power. Alternatively or additionally, for example when no one processor 82 has sufficient available processing power, one or more client modems 30 in sleep state 52, as necessary, are transferred to other processors 82. Further alternatively or additionally, one or more client modems 30 in sleep state 52 are transferred from a processor 82B to other processors 82 in order to make room for the transfer of the client modem 30 moving to active state 50, from processor 82A to processor 82B.

In an embodiment of the invention, the determination of which client modem 30 is to be transferred, is performed as described in Israel patent application 132,888, "Channel Load Balancing", filed Nov. 11, 1999, the disclosure of which is incorporated herein by reference.

Figure 5:
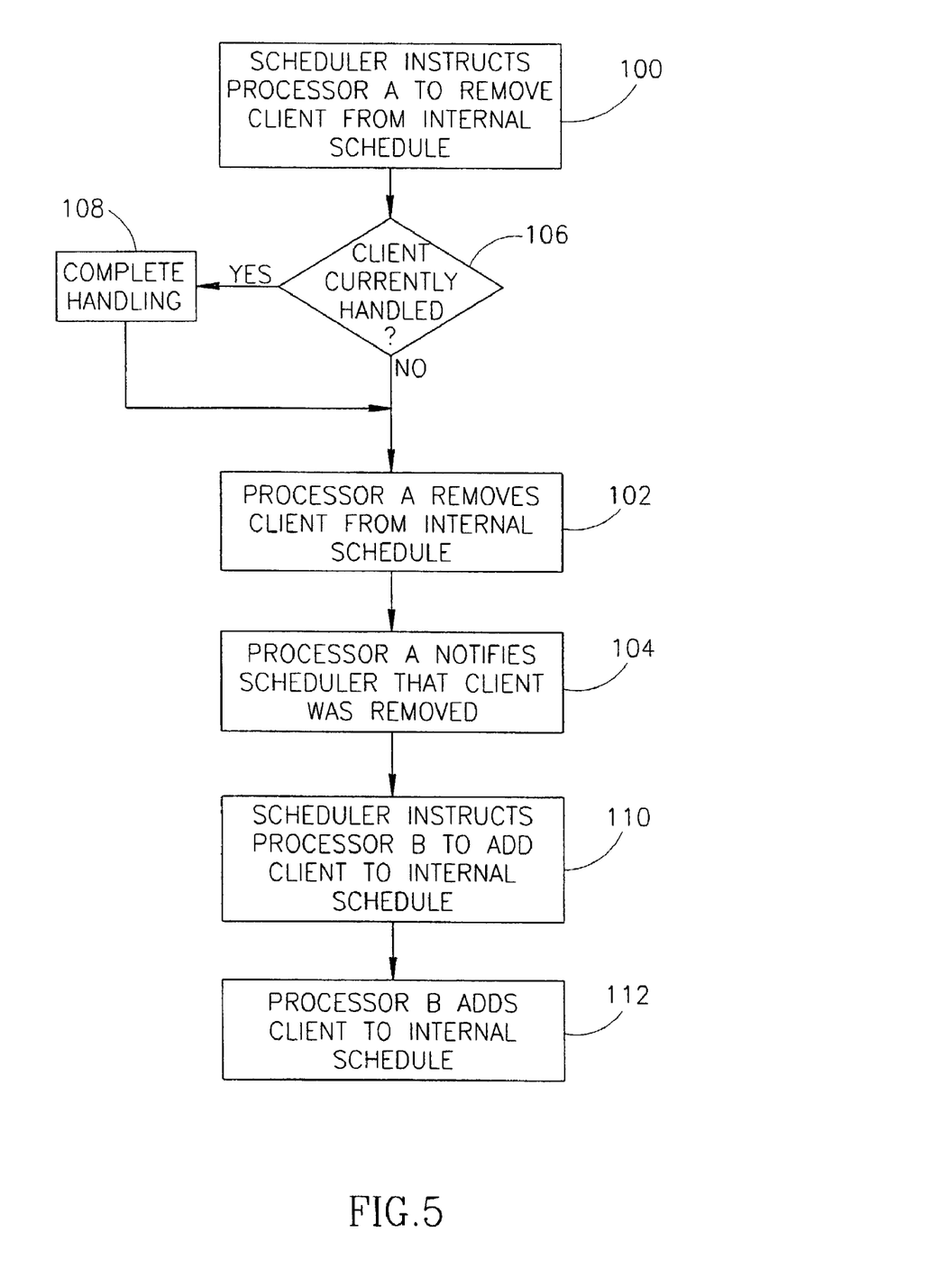
FIG. 5 is a flowchart of the actions performed in transferring the handling of a client modem between processors, in accordance with an embodiment of the present invention.

FIG. 5 is a flowchart of the actions performed in transferring a client modem 30 from a first processor 82A to a second processor 82B, in accordance with an embodiment of the present invention. When scheduler 84 determines that a particular client modem 30 is to be transferred from processor 82A to processor 82B, scheduler 84 instructs (100) processor 82A to remove the particular client modem 30 out of its internal scheduling order. Processor 82A removes (102) the particular client modem 30 from its scheduling order and notifies (104) scheduler 84 to this effect. In some embodiments of the invention, if (106) the particular client modem 30 is currently being handled, processor 82A completes (108) the handling before it removes (102) the particular client modem 30 from its scheduling order. Alternatively, in order to minimize the time in which the transferred modem 30 is not handled due to the transfer, processor 82A handles the client modem 30 before it removes (102) the client modem 30 from the scheduling order. It is noted that this handling may delay the transfer by a short period, due to the wait until the turn of the transferred client modem 30 is reached.

Thereafter, scheduler 84 instructs (110) processor 82B to add the client modem 30 to its internal scheduling order. In an embodiment of the invention, scheduler 84 supplies processor 82B with the address in common memory 86 of the record of the transferred modem 30. Alternatively, common memory 86 comprises a table 90 (FIG. 4) which lists the addresses of the records of all the client modems 30 handled by modem pool 80, and processor 82B accesses table 90 to determine the address of the record of the transferred client modem 30. Processor 82B adds (112) the client modem 30 to the end of the scheduling order to prevent a different client modem 30 from not receiving handling on time (i.e., starving) due to the transfer. Alternatively, processor 82B checks where in the scheduling order the transferred client modem can be placed without causing starvation to any of the client modems 30 handled by processor 82B.

In some embodiments of the invention, when the transferred client modem 30 is transferred due to its need to move from sleep state 52 to active state 50, modem pool 80 changes the data rate of the connection with the client modem, concurrently with the transfer process described in FIG. 5. Thus, when processor 82B first processes the data of the transferred client modem 30, the client modem 30 is in active state 50. In an embodiment of the invention, the negotiation of the data rate (e.g., the retrain) is performed by processor 82A from which the client modem 30 is transferred. Alternatively, the negotiation of the data rate is performed by processor 82B to which the client modem 30 was transferred. Further alternatively, a different processor other than processors 82A and 82B performs the data rate negotiation. Further alternatively, processors 82A and 82B split between them the rate negotiation. For example, the transfer between processor 82A and 82B in performing a training similar to that described in the G.DMT recommendation may be performed during the C-QUITE2 state, such that processor 82A handles the training until the QUITE2 state is reached and thereafter processor 82B handles the training.

It is noted that transferring the handling of a client modem 30 between processors 82 involves, in many cases, a short period during which the data of the client modem 30 is not handled properly. By performing the transfer at the same time with the retraining this short period is overlapped by the period in which client modem 30 is not handled due to the retraining. Thus, the annoyance to the user of client modem 30 is reduced.

In some embodiments of the invention, processors 82 are divided into groups which handle client modems 30 in different states. For example, for the two state case of FIG. 3, processors 82 are divided into two groups: a group which handles client modems 30 in active state 50 and a group which handles client modems 30 in sleep state 52. When a client modem 30 moves from one state to the other, it is transferred between the groups of processors 82. Thus, each processor is assigned to handle only modems 30 in a single state, thus simplifying the internal scheduling of the modems 30 handled by the processor. In addition, having each processor handle only client modems 30 in a single state simplifies the assigning of the client modems 30 to processors 82 by stating a number of client modems 30 which can be handled by each processor 82 rather than calculating the processing power. For three or more possible states, three or more groups of processors 82 are optionally defined. In an embodiment of the present invention, the groupings of processors 82 are predefined and do not change during the operation of modem pool 80. Alternatively, the groupings of processors 82 change dynamically based on the number of processors and/or processing power required from each group.

In addition to reducing the current consumption of DSL modems within switching boxes, the embodiments of the present invention, reduce the physical space required by the DSL modems in the switching box and the cost of the DSL modems in the switching box.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A DSL modem pool, comprising:
   an array of one or more processors which have a total processing power sufficient to handle connections with a predetermined number of client DSL modems at maximal data rates promised to the client modems;
   an analog front end adapted to connect the array of processors to a number of client DSL modems larger than the predetermined number of client DSL modems; and
   a scheduler adapted to dynamically determine at least one of the client modems to be handled at a rate substantially lower than the respective maximal data rate promised to the at least one client modem, so that the processing power required by the client modems connected to the array of processors does not exceed the total processing power of the array.

2. A modem pool according to claim 1, wherein the analog front end is adapted to connect to at least twice the predetermined number of client DSL modems.

3. A modem pool according to claim 1, wherein the array of one or more processors is adapted to communicate with more than half the client modems connected to the analog front end, at a rate substantially lower than the respective maximal data rate promised to the client modems.

4. A modem pool according to claim 1, wherein the array of one or more processors is adapted to communicate with the at least one of the client modems, at a rate lower than 20% of the respective maximal data rate of the client modem.

5. A modem pool according to claim 1, wherein the array of one or more processors is adapted to communicate with the at least one of the client modems, at a rate lower than 0.1 Mbps.

6. A modem pool according to claim 1, wherein the analog front end substantially continuously transmits signals to each of the client modems connected to the array of processors.

7. A modem pool according to claim 1, wherein the at least one of the client modems to be handled at a rate substantially lower than the respective maximal data rate is selected responsive to the amount of information transmitted to the client modems.

8. A modem pool according to claim 1, wherein the at least one of the client modems to be handled at a rate substantially lower than the respective maximal data rate is selected responsive to quality of service values assigned to the client modem.

9. A modem pool according to claim 1, wherein the scheduler is adapted to change the transmission rate of a first connection responsive to a need to change the transmission rate of a second connection.

10. A modem pool according to claim 9, wherein the scheduler is adapted to select the first connection as a connection with a low quality of service.

11. A modem pool according to claim 9, wherein the scheduler is adapted to select the first connection as a connection on which information was not transmitted for a longest time.

12. A modem pool according to claim 1, wherein the scheduler is adapted to handle a transmission such that substantially always the signals transmitted to at least one dynamically chosen client modem are at a rate substantially lower than a maximal allowed rate.

13. A modem pool according to claim 1, wherein the scheduler is adapted to initiate changing the data rate at which the signals are transmitted to at least one client modem, responsive to a determination that the transmitted signals do not include information.

14. A modem pool according to claim 1, wherein the scheduler is adapted to transfer the handling of a client modem from a first processor to a second processor if the client modem requires an increase in the processing power, which increase is above the available processing power of the first processor.

15. A modem pool according to claim 1, comprising a common memory which includes a record for each of the DSL client modems serviced by the modem pool and which is accessible by all the processors of the modem pool.

16. A modem pool according to claim 1, wherein each of the DSL client modems handled by the modem pool has a maximal data rate at which it may operate and wherein the combined processing power of all the processors of the modem pool is substantially less than the processing power required to handle all the DSL client modems handled by the modem pool at their respective maximal data rates.

17. A modem pool according to claim 16, wherein the combined processing power of all the processors of the modem pool is less than a fifth of the processing power required to handle all the DSL client modems handled by the modem pool at their respective maximal data rates.

18. A modem pool according to claim 1, comprising at least one switch which dynamically connects each of the interfaces of the front end to one or more of the plurality of processors, under instructions of the scheduler.

19. A modem pool according to claim 1, comprising at least one multiplexer which connects the interfaces of the front end to an at least one switch.

* * * * *